United States Patent
Syvertsen et al.

(10) Patent No.: US 10,618,487 B2
(45) Date of Patent: Apr. 14, 2020

(54) COLLISION DETECTION DEVICE FOR A MOTOR VEHICLE

(71) Applicant: Bayerische Motoren Werke Aktiengesellschaft, Munich (DE)

(72) Inventors: Bernt Arne Syvertsen, Munich (DE); Christian Berthold, Baierbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 48 days.

(21) Appl. No.: 15/989,991

(22) Filed: May 25, 2018

(65) Prior Publication Data

US 2018/0272971 A1 Sep. 27, 2018

Related U.S. Application Data

(63) Continuation of application No. PCT/EP2016/078053, filed on Nov. 17, 2016.

(30) Foreign Application Priority Data

Nov. 27, 2015 (DE) ........................ 10 2015 223 547

(51) Int. Cl.
*B60R 21/0136* (2006.01)
*B60R 19/48* (2006.01)
*B60R 19/02* (2006.01)
*B60R 19/03* (2006.01)
*B60R 21/00* (2006.01)

(52) U.S. Cl.
CPC ........ *B60R 21/0136* (2013.01); *B60R 19/023* (2013.01); *B60R 19/03* (2013.01); *B60R 19/483* (2013.01); *B60R 2021/0004* (2013.01)

(58) Field of Classification Search
CPC ....... B60R 19/02; B60R 19/023; B60R 19/03; B60R 19/48; B60R 19/183; B60R 21/013; B60R 21/0136
USPC ........................................................ 293/117
See application file for complete search history.

(56) References Cited

U.S. PATENT DOCUMENTS

| | | | | |
|---|---|---|---|---|
| 7,293,809 B2* | 11/2007 | Suzuki | ................ | B60R 21/0136 293/117 |
| 7,980,606 B2* | 7/2011 | Takahashi | ........... | B60R 21/0136 293/117 |
| 9,834,164 B1* | 12/2017 | Iyer | ........................ | B60R 19/483 |

(Continued)

FOREIGN PATENT DOCUMENTS

| | | |
|---|---|---|
| DE | 20 2004 005 434 U1 | 9/2004 |
| DE | 10 2012 004 766 A1 | 11/2012 |
| DE | 10 2012 019 380 A1 | 4/2014 |

(Continued)

OTHER PUBLICATIONS

English translation of WO 2012/133362; retreived Sep. 5, 2019 via PatentTranslate located at www.epo.org. (Year: 2019).*

(Continued)

*Primary Examiner* — Jason S Daniels
(74) *Attorney, Agent, or Firm* — Crowell & Moring LLP

(57) ABSTRACT

A collision detection device for a motor vehicle includes a pressure measurement chamber formed by a hose. A projection is disposed on the outer circumference of the hose in such a way that the hose deforms more readily in case of a collision. This makes it easier for the pressure to change in the pressure measurement chamber.

19 Claims, 2 Drawing Sheets

(56) References Cited

U.S. PATENT DOCUMENTS

| | | | |
|---|---|---|---|
| 10,093,255 B2 * | 10/2018 | Aizawa | B60R 19/18 |
| 2016/0039379 A1 * | 2/2016 | Saitoh | B60R 19/18 |
| | | | 293/117 |

FOREIGN PATENT DOCUMENTS

| | | | |
|---|---|---|---|
| DE | 10 2013 016 239 A1 | 4/2015 | |
| DE | 10 2014 113 400 A1 | 4/2015 | |
| DE | 10 2014 214 595 A1 | 1/2016 | |
| EP | 0 197 676 A1 | 10/1986 | |
| JP | 2011143825 A * | 7/2011 | B60R 19/18 |
| WO | WO-2012133362 A1 * | 10/2012 | C23C 2/003 |

OTHER PUBLICATIONS

English translation of DE 10 2014 113 400; retreived Sep. 5, 2019 via PatentTranslate located at www.epo.org. (Year: 2019).*

International Search Report (PCT/ISA/210) issued in PCT Application No. PCT/EP2016/078053 dated Feb. 7, 2017 with English translation (five (5) pages).

German-language Written Opinion (PCT/ISA/237) issued in PCT Application No. PCT/EP2016/078053 dated Feb. 7, 2017(six (6) pages).

German-language Search Report issued in counterpart German Application No. DE 10 2015 223 547.5 dated Mar. 24, 2016 (ten (10) pages) with partial English Translation (fifteen (15) pages).

* cited by examiner

COLLISION DETECTION DEVICE FOR A MOTOR VEHICLE

CROSS REFERENCE TO RELATED APPLICATIONS

This application is a continuation of PCT International Application No. PCT/EP2016/078053, filed Nov. 17, 2016, which claims priority under 35 U.S.C. § 119 from German Patent Application No. 10 2015 223 547.5, filed Nov. 27, 2015, the entire disclosures of which are herein expressly incorporated by reference.

BACKGROUND AND SUMMARY OF THE INVENTION

The present invention relates to a collision detection device for a motor vehicle, comprising a pressure measurement chamber, which is formed by a hose, as well as to a motor vehicle front or rear module with such a collision detection device. The collision detection device is used in particular to detect a collision of the motor vehicle with a pedestrian.

It is known to arrange an energy-absorbing element in a motor vehicle, in particular in a two-track passenger car, between a bumper cladding and a front bumper cross member, which energy-absorbing element is deformable to protect a pedestrian in the event of a collision of the motor vehicle with the pedestrian at a relatively low force level. Furthermore, a collision detection sensor based on a pressure measurement is known. The collision detection sensor serves to detect a collision with a pedestrian so that a control unit, on the basis of this detection, can actively control pedestrian protection measures, for example raising a front flap or triggering a windscreen airbag. Such a collision detection sensor includes a hose to which a pressure sensor is connected, which can detect pressure fluctuations within the hose. The hose is filled with air at atmospheric pressure. If the hose is deformed as a result of the collision with the pedestrian, a pressure change takes place inside the hose. Such a hose is usually arranged in the vehicle transverse direction in abutment against the bumper cross member and accommodated in a groove formed in the energy-absorbing element.

Depending on the configuration of the bumper cladding, the bumper cross member and/or the energy-absorbing element as well as the hose, however, there can be a need to improve the response behavior of the collision detection sensor.

According to DE 10 2012 004 766 A1, this is solved, for example, whereby an energy-absorbing element in which a hose for collision measurement is accommodated, has a particular geometry so that a compression of the energy-absorbing element is facilitated and thus a deformation of the hose in the event of a collision also takes place more rapidly. By this means, a response behavior or a signal quality of a sensor is improved.

It is furthermore known from DE 10 2013 016 239 A1 to form moldings on counter bearings of a vehicle front, which are designed in such a manner that an adjoining hose can be deformed better or more easily for collision measurement. The result is that a response behavior or a signal quality of a sensor is also improved.

It is an object of the present invention to provide a collision detection device comprising a pressure measurement chamber formed by a hose, as well as a motor vehicle front or rear module with such a collision detection device, wherein a collision-induced deformation of the hose is promoted without changing a structure surrounding the hose.

This and other objects are achieved by a collision detection device, and a motor vehicle front or rear module having such a collision detection device, in accordance with embodiments of the invention.

A collision detection device for a motor vehicle according to the present invention has a pressure measurement chamber which is formed by a hose. Furthermore, a projection is arranged on an outer circumference of the hose in such a manner that a collision-induced deformation of the hose is promoted. By this measure, a pressure variation in the pressure measurement chamber is also promoted accordingly.

As a result of the invention, a response behavior, i.e. a more rapid signal generation or a more sensitive signal generation of the collision detection device as a result of a stressing of the motor vehicle due to the collision, is improved. Furthermore, no additional measures are required to increase the response behavior at elements adjoining the hose in order to promote a deformation of the hose in the course of the collision. Furthermore, as a result of the formation of the projection on the hose, a required accuracy in the positioning of the hose is reduced so that lower requirements on manufacturing tolerances are possible. Due to the collision device according to the invention, it is possible to use these on different motor vehicles in order to increase a response behavior without needing to make a modification to the motor vehicles.

According to a preferred further development, the projection is formed integrally with the hose. In other words, the projection is formed during a manufacturing process of the hose.

Alternatively, the projection can also be connected in a firmly-bonded manner to the hose. For example, the hose can be adhesively bonded to the projection.

As a result, the hose or the collision detection device with the hose can be arranged on different vehicles and at different positions of the vehicles without it being necessary to make an adaption to the surrounding vehicle structure for this purpose to increase a response behavior of the collision detection device.

According to a preferred further development, the hose is formed from an extruded plastic material.

The hose can be manufactured cost-effectively by extrusion.

The projection can be manufactured integrally with the hose in the extrusion process in a cost-effective manner.

The hose can be formed in this case from an elastomer material and particularly advantageously from a silicone material. Such materials make it possible to achieve a particularly easily deformable hose.

In the collision detection device according to the present invention, furthermore a pressure sensor can be arranged in such a manner that it communicates with the pressure measurement chamber and the pressure sensor can be adapted to record a pressure and/or a pressure change in the pressure measurement chamber as a consequence of the deformation of the hose.

Advantageously, the projection can extend in the longitudinal direction of the hose.

Thus, a response behavior of the collision detection device with the hose can be improved over the length of the hose provided with the projection.

According to a preferred further development, the projection can extend substantially over the entire effective length of the hose and therefore the measurement chamber.

Such a hose is particularly easy to manufacture, for example, by the extrusion process and can ensure that the response behavior of the collision detection device is improved over the entire length of the hose.

The projection can, however, also only extend in sections in the longitudinal direction of the hose or the measurement chamber. In other words, a plurality of projections can thus be arranged according to a desired response behavior of the collision device.

It can, for example, be desired that the response behavior is only improved at certain positions in order to achieve an approximately same response behavior over an entire length of the collision device.

The projection can have a constant cross-sectional shape in the longitudinal direction of the hose.

Alternatively, the projection can have different cross-sectional shapes in the longitudinal direction of the hose, which bring about a desired different deformation behavior of the hose in the longitudinal direction of the hose.

As a result, the response behavior of the collision detection device or the hose with its pressure measurement chamber can be adapted according to a desired response behavior by simple means.

According to a particularly preferred embodiment of the collision detection device, a cross-sectional shape of the projection is configured to be substantially trapezoidal wherein the short side of the trapezoid is facing the hose.

As a result, a deformation of the hose can be further promoted, whereby the pressure on the hose is concentrated through the short side of the trapezoid.

Advantageously, apart from the section on which the projection is formed, the hose has a constant wall thickness.

As a result, the hose can be manufactured cost-effectively and exhibits a constant deformation behavior along its circumference.

According to a preferred further development of the collision device, the measurement chamber, i.e. an inside diameter of the hose, in the non-deformed state of the hose, has a substantially circular cross-section or an oval cross-section.

Furthermore, the present invention relates to a motor vehicle front or rear module, which has a collision detection device as described above.

In particular, a motor vehicle front or rear module with the collision detection device has a hose, which is arranged in such a manner that the projection adjoins a rigid structural element of the motor vehicle front or rear module in the collision direction and the hose is supported via the projection on the structural element.

According to a preferred further development, the structural element can be a bumper cross member, a bumper cladding and/or a cross member element above or below the bumper cross member.

Preferably, a cross-sectional shape of the hose can be configured in the vehicle transverse direction according to a desired response behavior of the collision detection device over the vehicle width.

Depending on the structure of the vehicle front or rear module over its width, a different response behavior of the hose can be required due to a different surrounding structure, which can easily be achieved by adapting the cross-sectional shape of the projection of the hose.

Furthermore, the hose can be arranged, integrated or accommodated in an energy-absorbing element, which in particular is formed from a foamed material and which is usually also designated as pedestrian protective element.

The aforesaid further developments of the invention can be arbitrarily combined with one another as far as is possible and appropriate.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the present invention are described in detail hereinafter with reference to FIGS. 1 to 4.

Figure 1:
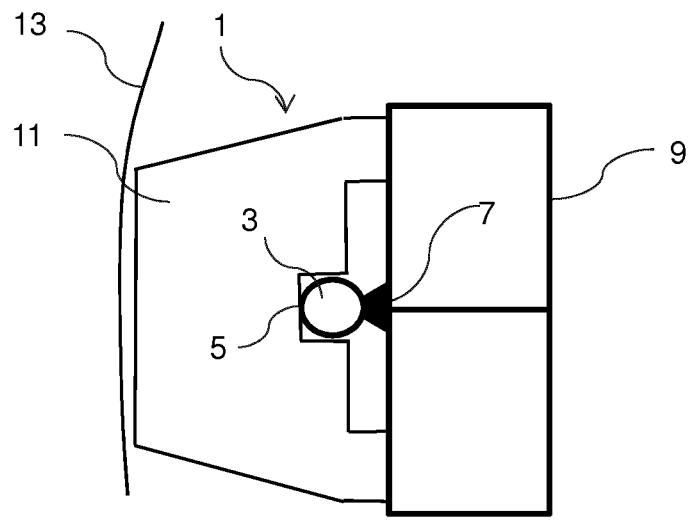
FIG. 1 is a schematic sectional view of a motor vehicle front module according to a first exemplary embodiment of the present invention.
Figure 2:
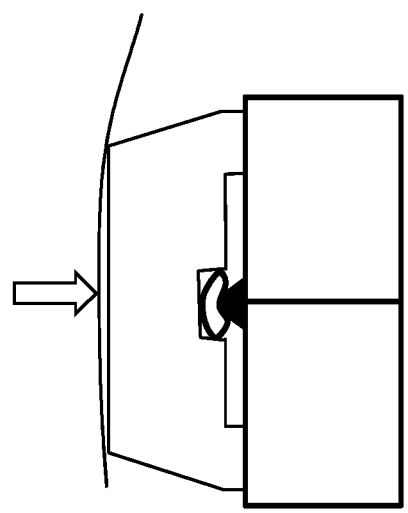
FIG. 2 is a schematic sectional view of the motor vehicle front module according to the first exemplary embodiment of the present invention in a collision-induced deformed state.

According to a first exemplary embodiment of the present invention, which is shown in FIGS. 1 and 2, a motor vehicle front module has a collision detection device 1, which has a pressure measurement chamber 3, which is formed by a hose 5 having a circular inner cross-section. On the hose 5, a projection 7 is formed integrally on an outer side of the hose. The projection 7 has a substantially trapezoidal cross-section, wherein a short side of the trapezoid adjoins the circularly cylindrical circumference of the hose 5. The other side of the projection 7, i.e. the long side of the trapezoid, is supported on a front side of a front bumper cross member 9, which forms a rigid structural element according to the present invention.

The bumper cross member 9 according to the first exemplary embodiment is formed schematically as an extruded profile having a closed cross-section with two chambers. However, the bumper cross member can also be formed in any other known form. An energy-absorbing element 11 is further arranged on the bumper cross member 9, which can also be designated as pedestrian protective element. The energy-absorbing element 11 consists of a foam material, which is deformable at a relatively low force level for the protection of a pedestrian in the event of a frontal collision of the motor vehicle with the pedestrian. The energy-absorbing element 11 in the same way as the hose 5 with its projection 7 is supported on a front side of the bumper cross member 9 and fastened thereon. A groove, which accommodates the hose 5 with the projection 7 is formed in the energy-absorbing element 11, in particular on the side of the energy-absorbing element 11 facing the bumper cross member 9. In other words, the energy-absorbing element 11 at least partially surrounds the hose 5. The energy-absorbing element 11 is arranged between a bumper cladding 13, which forms an outer skin of the motor vehicle or the motor vehicle front module and the bumper cross member 9.

The hose 5 is made of a silicone material integrally with the projection 7 by extrusion. The projection 7 extends in the present case over an entire effective length of the hose 5, which extends over an entire width of the bumper cross member 9 and therefore the motor vehicle front module. Connected to the pressure measurement chamber 3, which is formed by the interior of the hose 5, is at least one pressure measurement sensor, which in the event of a collision-induced deformation of the hose 5, records a pressure variation in the pressure measurement chamber 3. The pressure measurement chamber 3 is filled with air at atmospheric pressure, wherein each deformation results in a pressure wave inside the pressure measurement chamber 3.

With reference to FIG. 2, a function of the collision detection device or the motor vehicle front module of the first exemplary embodiment in the case of a frontal collision of the motor vehicle with a pedestrian is now described.

In the case of a frontal collision, which is shown by the arrow in FIG. 2, the bumper cladding 13 is displaced or pressed in the direction of the bumper cross member 9 under deformation, in particular plastic deformation, of the energy-absorbing element 11. In other words, the energy-absorbing element 11 is compressed under the collision load and presses onto the hose at a contact surface to the hose 5 so that the hose 5 is also deformed or compressed as shown in FIG. 2. This deformation is additionally supported or promoted by the projection 7, which, since it has no cavity, is less easily deformable like the hose 5 with the pressure measurement chamber 3. The projection 7 forms a support element of the hose 5, which has a supporting effect on a relatively small area at the circumference of the hose 5. Accordingly, when the hose 5 is compressed, this is compressed and deformed around the projection 7, which in the case of the same collision load, results in a comparatively greater pressure variation in the hose 5 compared to a hose, which has no projection 7 and which is supported without the projection 7 on the front side of the bumper cross member 9.

Thus, a response behavior of the collision detection device is improved, i.e. due to the stronger deformation of the hose 5, a higher pressure is achieved in the pressure measurement chamber 3 or a specific pressure is achieved in the pressure measurement chamber 3 at an earlier time point.

Furthermore, the invention according to the first exemplary embodiment has the advantage that the hose 5 together with the projection 7 can be positioned at any point of the bumper cross member 9 with the same effect.

Depending on the desired response behavior, the projection 7 can also be formed only over a part of the effective length of the hose 5 or can have a different cross-sectional shape at different sections, whereby the deformation behavior of the hose 5 can be varied accordingly.

Figure 3:
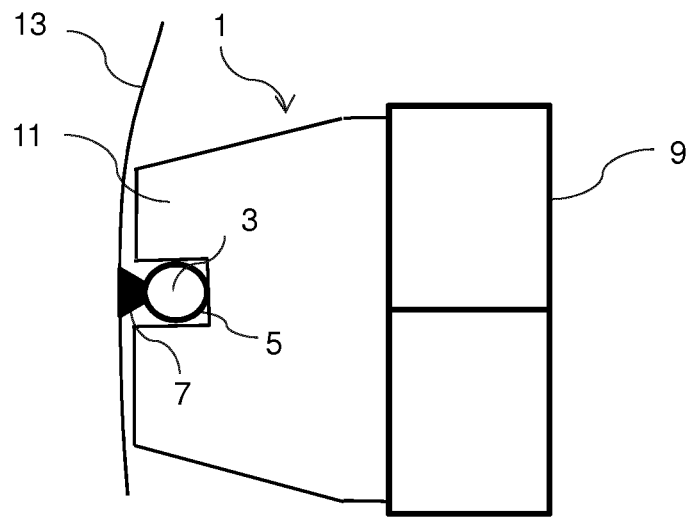
FIG. 3 is a schematic sectional view of a motor vehicle front module according to a second exemplary embodiment of the present invention.
Figure 4:
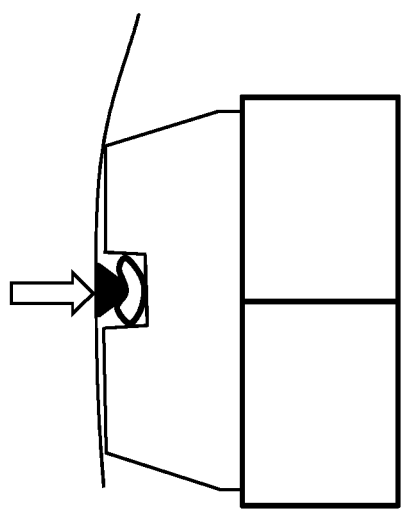
FIG. 4 is a schematic sectional view of the motor vehicle front module according to the second exemplary embodiment of the present invention in a collision-induced deformed state.

A second exemplary embodiment of the present invention will be described hereinafter with reference to FIGS. 3 and 4, wherein in particular the differences from the first exemplary embodiment are discussed and a description of the common features is substantially omitted.

A vehicle front module 1 according to the second exemplary embodiment of the present invention also has a collision detection device 1 having a hose 5, on which a projection 7 is integrally extruded.

The vehicle front module has a bumper cross member 9, on the front side of which an energy-absorbing element 11 is arranged. The energy-absorbing element 11 is arranged between a bumper cladding 13 and the bumper cross member 9.

Unlike the first exemplary embodiment, the projection 7 is supported on the bumper cladding 13 and the hose 5 with the projection 7 is accommodated in the energy-absorbing element 11 in a groove on a front side thereof.

A function and effect of the collision detection device or the motor vehicle front module according to the second exemplary embodiment is now described with reference to FIG. 4. In the case of the collision, the collision load is transferred directly to the projection 7, which in turn brings about a deformation of the hose 5 and promoted by a concentration of the collision load on a small section of the circumference of the hose 5. A rear side of the hose 5 is in this case extensively supported on the deformation element 11.

As a result, a response behavior of the hose 5 or the measurement chamber 3 similarly to the first exemplary embodiment can be improved considerably compared to a hose without a projection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A collision detection device for a motor vehicle, comprising:
   a hose having a pressure measurement chamber; and
   a projection formed on an outer circumference of the hose such that a collision-induced deformation of the hose is promoted, wherein
   a cross-sectional shape of the projection is configured to be substantially trapezoidal and a short side of the trapezoid faces the hose in order to concentrate pressure on the hose.

2. The collision detection device as claimed in claim 1, wherein
   the projection is formed integrally with the hose, or
   the projection is connected in a firmly-bonded manner to the hose.

3. The collision detection device as claimed in claim 2, wherein
   the hose is formed from an extruded plastic material.

4. The collision detection device as claimed in claim 3, wherein the plastic material is an elastomer material.

5. The collision detection device as claimed in claim 3, wherein the plastic material is a silicone material.

6. The collision detection device as claimed in claim 1, further comprising:
   a pressure sensor arranged such that the sensor communicates with the pressure measurement chamber, wherein
   the pressure sensor is adapted to record a pressure and/or a pressure change in the pressure measurement chamber as a consequence of the deformation of the hose.

7. The collision detection device as claimed in claim 1, wherein
   the projection extends in a longitudinal direction of the hose.

8. The collision detection device as claimed in claim 7, wherein
   the projection extends substantially over an entire effective length of the hose.

9. The collision detection device as claimed in claim 7, wherein
the projection extends substantially over an entire effective length of the pressure measurement chamber.

10. The collision detection device as claimed in claim 7, wherein
the projection extends in sections in a longitudinal direction of the hose or the pressure measurement chamber, which brings about a correspondingly different deformation behavior of the hose.

11. The collision detection device as claimed in claim 1, wherein
the projection has a constant cross-sectional shape in the longitudinal direction of the hose, or the projection has different cross-sectional shapes in the longitudinal direction of the hose which bring about a correspondingly different deformation behavior of the hose.

12. The collision detection device as claimed in claim 1, wherein
the hose has a constant wall thickness.

13. The collision detection device as claimed in claim 1, wherein
the pressure measurement chamber has a substantially circular cross-section or an oval cross-section.

14. A motor vehicle module comprising a collision detection device as claimed in claim 1, wherein
the hose is arranged such that the projection adjoins a rigid structural element of the motor vehicle module in the collision direction and the hose is supported via the projection on the structural element.

15. The motor vehicle module as claimed in claim 14, wherein
the motor vehicle module is a front or a rear module of the motor vehicle.

16. The motor vehicle module as claimed in claim 15, wherein
the structural element is a bumper cross member, a bumper cladding and/or a cross member element above or below the bumper cross member.

17. The motor vehicle module as claimed in claim 14, wherein
a cross-sectional shape of the projection of the hose is configured in the vehicle transverse direction to provide a desired response behavior of the collision detection device over the vehicle width.

18. The motor vehicle module as claimed in claim 14, wherein
the hose is arranged in/on an energy-absorbing element.

19. The motor vehicle module as claimed in claim 18, wherein
the energy-absorbing element is formed of a foamed material.

* * * * *